United States Patent
Hecker et al.

(10) Patent No.: US 12,483,168 B2
(45) Date of Patent: Nov. 25, 2025

(54) METHOD FOR DETERMINING THE ANGULAR POSITION OF THE ROTOR OF AN INVERTER-FED SYNCHRONOUS MOTOR, AND AN APPARATUS FOR CARRYING OUT THE METHOD

(71) Applicant: SEW-EURODRIVE GMBH & CO. KG, Bruchsal (DE)

(72) Inventors: Christian Hecker, Forst (DE); Thomas Schuster, Ottenbach (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 771 days.

(21) Appl. No.: 17/081,184

(22) Filed: Oct. 27, 2020

(65) Prior Publication Data
US 2021/0044235 A1 Feb. 11, 2021

Related U.S. Application Data

(63) Continuation of application No. 16/470,083, filed as application No. PCT/EP2017/025334 on Nov. 14, 2017, now Pat. No. 10,819,263.

(30) Foreign Application Priority Data

Dec. 14, 2016 (DE) .......................... 102016014829.2

(51) Int. Cl.
*H02P 21/06* (2016.01)
*H02K 3/28* (2006.01)
(Continued)

(52) U.S. Cl.
CPC ............... *H02P 21/06* (2013.01); *H02K 3/28* (2013.01); *H02P 21/141* (2013.01); *H02P 25/08* (2013.01); *H02P 2207/05* (2013.01)

(58) Field of Classification Search
CPC .. H02P 21/18; H02P 6/18; H02P 21/14; H02P 21/26; H02P 25/08; H02P 2207/05; H02P 21/12; H02P 21/28; H02K 3/28
See application file for complete search history.

(56) References Cited

U.S. PATENT DOCUMENTS

| 4,303,875 A | 12/1981 | Montorio |
| 4,503,391 A | 3/1985 | Hinke |

(Continued)

OTHER PUBLICATIONS

Gilbert Hock Beng Foo, Direct Torque Control of an IPM-Synchronous Motor Drive at Very Low Speed Using a Sliding-Mode Stator Flux Observer, 2010, IEEE, 933-942 (Year: 2010).*

(Continued)

*Primary Examiner* — Bickey Dhakal
(74) *Attorney, Agent, or Firm* — Carter, DeLuca & Farrell LLP

(57) ABSTRACT

A method for determining an angular position of a rotor of a synchronous motor, having a stator winding fed by a three-phase voltage set by an inverter, includes: supplying a control signal to the inverter to set the three-phase voltage fed to the motor as a stator voltage to control a motor current, acquired by a current-acquisition device, to a setpoint stator current; determining a stator flux from a time characteristic of the stator voltage and an acquired value of the stator current; and determining the angular position of the rotor from the stator flux and a flux-value dependence as a function of the stator current.

19 Claims, 7 Drawing Sheets

(51) Int. Cl.
 *H02P 21/14* (2016.01)
 *H02P 25/08* (2016.01)

(56) References Cited

U.S. PATENT DOCUMENTS

| | | | |
|---|---|---|---|
| 4,970,450 | A | 11/1990 | Karl et al. |
| 5,264,844 | A | 11/1993 | Itou et al. |
| 6,137,257 | A | 10/2000 | Heber et al. |
| 6,476,600 | B2 | 11/2002 | Kono et al. |
| 6,778,063 | B1 | 8/2004 | Chen |
| 9,696,183 | B2 | 7/2017 | Smithanik et al. |
| 10,819,263 | B2 * | 10/2020 | Hecker ............ H02P 21/141 |
| 2003/0015987 | A1 * | 1/2003 | Cheong ............ H02P 25/08 318/701 |
| 2004/0145334 | A1 | 7/2004 | Virtanen |
| 2008/0129243 | A1 * | 6/2008 | Nashiki ............ H02K 1/246 318/701 |
| 2014/0070745 | A1 * | 3/2014 | Hirono ............ H02P 6/18 318/400.32 |
| 2014/0203754 | A1 * | 7/2014 | Bhangu ............ H02P 21/0089 318/702 |
| 2015/0028782 | A1 * | 1/2015 | Crosman, III ....... H02P 23/14 318/400.15 |
| 2015/0381081 | A1 * | 12/2015 | Bhangu ............ H02P 21/0089 318/400.05 |

OTHER PUBLICATIONS

Ozturk et al., Direct Torque and Indirect Flux Control of Brushless DC Motor, 2011, IEEE, 351-360 (Year: 2011).*
Field Orientated Control of 3-Phase AC-Motors, Texas Instruments, pp. 3 and 4 (Year: 1998).*
J.L. Kirtley, Jr, Synchronous Machine and Winding Models, MIT, p. 4 (Year: 2011).*
International Search Report issued Feb. 13, 2018, in International Application No. PCT/EP2017/025334 (English-language translation).
Tusini, M. et al., "Sensorless Control of an IPM Synchronous Motor for City-Scooter Applications" Department of Electrical Engineering, University of L'Aquila, (2003) pp. 1472-1479.
International Preliminary Report on Patentability issued from the International Bureau mailed on Jun. 27, 2019.
European Office Action issued in EP Application No. 22000009.5, dated Jun. 24, 2022, pp. 1-17, together with English-language translation.
Landsmann, P. et al., "Fundamental saliency based encoderless control for reluctance synchronous machines" The XIX International Conference on Electrical Machines—ICEM 2010 (Ocobter 2010) pp. 1-7.
Office Action issued by the European Patent Office dated Feb. 15, 2024 in corresponding EP Patent Application No. 22000009.5, with English translation.

* cited by examiner

```
┌─────────────────────────────────────────────────────┐
│                                                     │
│         Method for determining an angular           │
│              position of a rotor of a               │
│          synchronous motor including a              │
│           stator winding fed by a three-            │
│           phase voltage set by an inverter          │
│                         200                         │
│                                                     │
│   ┌─────────────────────────────────────────────┐   │
│   │ Supplying a control signal to the inverter  │   │
│   │   to set the three-phase voltage fed to     │   │
│   │  the motor as a stator voltage to control   │   │
│   │  a stator current, acquired by a current-   │   │
│   │  acquisition device, to a setpoint stator   │   │
│   │                  current                    │   │
│   │                    202                      │   │
│   └─────────────────────────────────────────────┘   │
│                                                     │
│   ┌─────────────────────────────────────────────┐   │
│   │ Determining a stator flux from a time       │   │
│   │ characteristic of the stator voltage and an │   │
│   │    acquired value of the stator current     │   │
│   │                    204                      │   │
│   └─────────────────────────────────────────────┘   │
│                                                     │
│   ┌─────────────────────────────────────────────┐   │
│   │ Determining the angular position of the     │   │
│   │ rotor from the stator flux and a flux-value │   │
│   │  dependence, which represents the stator    │   │
│   │  flux as a function of the angular position │   │
│   │  of the rotor, as a function of the stator  │   │
│   │                  current                    │   │
│   │                    206                      │   │
│   └─────────────────────────────────────────────┘   │
│                                                     │
└─────────────────────────────────────────────────────┘
```

Fig. 6

METHOD FOR DETERMINING THE ANGULAR POSITION OF THE ROTOR OF AN INVERTER-FED SYNCHRONOUS MOTOR, AND AN APPARATUS FOR CARRYING OUT THE METHOD

CROSS-REFERENCE TO RELATED APPLICATIONS

The present application is a continuations of U.S. patent application Ser. No. 16/470,083, which is the national stage of PCT/EP2017/025334, having an international filing date of Nov. 14, 2017, and claims priority to application Ser. No. 10/201,6014829.2, filed in the Federal Republic of Germany on Dec. 14, 2016, each of which is expressly incorporated herein in its entirety by reference thereto.

FIELD OF THE INVENTION

The present invention relates to a method for determining the angular position of the rotor of an inverter fed by a synchronous motor, and to an apparatus for carrying out the method.

BACKGROUND INFORMATION

Certain conventional electric motors are able to be supplied by an inverter.

SUMMARY

Example embodiments of the present invention provide a method for determining the angular position in a synchronous motor.

According to an example embodiment of the present invention, in a method for determining the angular position of a synchronous motor fed by an inverter, the inverter is controlled by a signal electronics having a control unit, in particular including a processing unit and a memory, the stator current is acquired with the aid of at least one current-acquisition device, in particular, the synchronous motor has a stator winding, which is fed by a three-phase voltage, i.e. stator voltage, which is set by the inverter such that the acquired stator current is controlled to a predefined setpoint stator current by the control unit, a stator setpoint current having a first actuation angle relative to the stator winding is predefined, in particular in the d-direction, the stator flux is determined from the time characteristic of the stator voltage and the acquired values of the stator current, and an angle value, in particular the angular position, is determined from the determined stator flux and a flux-value dependence as a function of the stator current.

This offers the advantage that the signals electronics supplies control signals for the inverter so that it supplies a three-phase voltage to the motor, i.e. to the stator winding of the motor, such that the acquired motor current is controlled to a respectively predefined setpoint stator current. Based on the acquired stator-current characteristic and the motor-voltage characteristic, a stator flux is determined, which is compared to the flux-value dependence. This makes it possible to determine the angular position. In order to arrive at an unambiguous determination, a further setpoint stator current is predefined, which is, for example, aligned perpendicular to the initially mentioned stator current, and the stator flux is determined again, which is compared to the flux-value dependence. The evaluation of the two determined angular positions allows for an unambiguous determination of the angular position.

As a result, the angular position is detectable without further sensors. The current-acquisition device may be used for the controlled operation of the synchronous motor.

The flux-value dependence is able to be acquired for each stator current either during the manufacture or the initial operation through a measurement, or it is determined from interpolation points which result as a respective value of a flux component according to a characteristic curve as a function of the stator current.

The flux value dependence represents the stator flux as a function of angle a of the rotor, and a setpoint stator current is predefined in the direction of an actuation angle, e.g., in the d-direction, to which the stator current is controlled.

According to example embodiments, a setpoint stator current with a further actuation angle in relation to the stator winding is predefined, in particular in the q-direction, and the stator flux is determined from the time characteristic of the stator voltage and the acquired values of the stator current, a further angle value, in particular a further angular position, is determined from the determined stator flux and a flux-value dependence that is a function of the stator current, in particular for the unambiguous determination of the further angle value. This offers the advantage that the setpoint stator current is initially predefined in a first direction and then in another direction. This makes it possible to perform the angle determination two times, and therefore allows for an unambiguous determination. This is so because the flux-value dependence has symmetries and the angle is therefore not able to be unequivocally determined through a single determination of this kind.

The flux-value dependence associated with a stator current is representable by an ellipsis so that the flux in the d-direction is smaller than in the q-direction. In an intermediate direction, i.e. a direction having angle a, which lies between the d-direction and the q-direction, the flux assumes a value that lies between the value in the q-direction and the value in the d-direction, according to the characteristic of the ellipsis.

Here, the ellipsis is a suitable interpolation function, which lends itself to an approximate determination of the intermediate values of the flux. The main axis is determined by the sum of the amounts of the value of the flux in the d-direction and counter to the d-direction, and the minor axis of the ellipsis is defined by double the value of the flux in the q-direction.

For the consideration of higher orders, and thus especially also for the consideration of a more precise characteristic of the inductivity, it is necessary to use a higher order function.

According to example embodiments, the stator flux is determined from the time characteristic of the stator voltage and the acquired values of the stator current, according to the relationship:

$$Y\_a = \int (U\_S - R\_S * I\_S) dt,$$

where RS is the stator resistance. This has the advantage that the stator flux that is associated with the respective current angular position is able to be determined from the acquired electrical variables such as the stator current and stator voltage. The flux may therefore be determined as a model variable even if the angular position, i.e. the angular position of the rotor in relation to the stator, is unknown.

According to example embodiments, the flux-value dependence is stored in a memory of the signal electronics, or characteristic curves are stored in a memory of the signal electronics from which the flux-value dependence is ascertained with the aid of respective interpolation functions, in particular stator-current-dependent interpolation functions. This offers the advantage that only a few items of data have to be stored, and the storing of characteristic curves, in particular, is sufficient, so that the flux-value dependence associated with the respective stator current is able to be represented by interpolation.

According to example embodiments, the flux-value dependence has a flux value as a function of the rotor angle and the stator current. This has the advantage that the value of the stator flux determined by integration is readily comparable to the flux-value dependence, thereby making it possible to ascertain the angular position of the rotor.

According to example embodiments, the function is an interpolation function, which interpolates between interpolation points. This offers the advantage of taking up only little memory space in the memory while still allowing the flux-value dependence to be taken into account.

According to example embodiments, a respective interpolation point is ascertained from the value of the stator current with the aid of a respective characteristic curve. This offers the advantage that the interpolation point is readily determined.

According to example embodiments, the respective characteristic curve represents a respective component of the flux as a function of the stator current so that the respective interpolation point has the value of a respective component in the currently acquired stator current. This is considered advantageous insofar as it allows for an uncomplicated ascertainment of the flux.

According to example embodiments, a first characteristic curve has the components of the flux in the d-direction, i.e. in a first direction of a rotor-based coordinate system. This is considered advantageous insofar as a characteristic curve that is readily determined is used.

According to example embodiments, a second characteristic curve has the components of the flux counter to the d-direction, i.e. counter to the first direction of the rotor-based coordinate system. This offers the advantage that a characteristic curve that is readily determined is used.

According to example embodiments, a third characteristic curve has the components of the flux in the q-direction, i.e. in the direction that is perpendicular to the first direction of the rotor-based coordinate system. This has the advantage that a characteristic curve that is readily determined is used.

According to example embodiments, the interpolation function is a second order function and/or an ellipsis in each case. This is considered advantageous insofar as there is no need to consider higher orders while still allowing for a sufficiently accurate determination of the angular positions.

According to example embodiments, from the relationship:

$$\sin{}^2(a)=(Y\_a{}^2-Y\_d{}^2)/(Y\_q{}^2-Y\_d{}^2), \text{ when } Y\_d<Y\_a<=Y\_q,$$

and from the relationship:

$$\sin{}^2(a-90°)=(Y\_a{}^2-Y\_q{}^2)/(Y\_{-}d{}^2-Y\_q{}^2), \text{ when } Y\_q<Y\_a<=Y\_{-}d.$$

This has the advantage of allowing for an uncomplicated determination.

According to example embodiments of the present invention, in an apparatus for carrying out the present method includes a current-acquisition device for acquiring the motor current is connected to the signal electronics. This is considered advantageous because it allows for a simple manufacture.

Further features and aspects of example embodiments of the present invention are described in greater detail below with reference to the appended Figures.

BRIEF DESCRIPTION OF THE DRAWINGS

FIG. 6 schematically illustrates a method for determining an angular position of a rotor of a synchronous motor including a stator winding fed by a three-phase voltage set by an inverter according to an example embodiment of the present invention.

DETAILED DESCRIPTION

Figure 1:
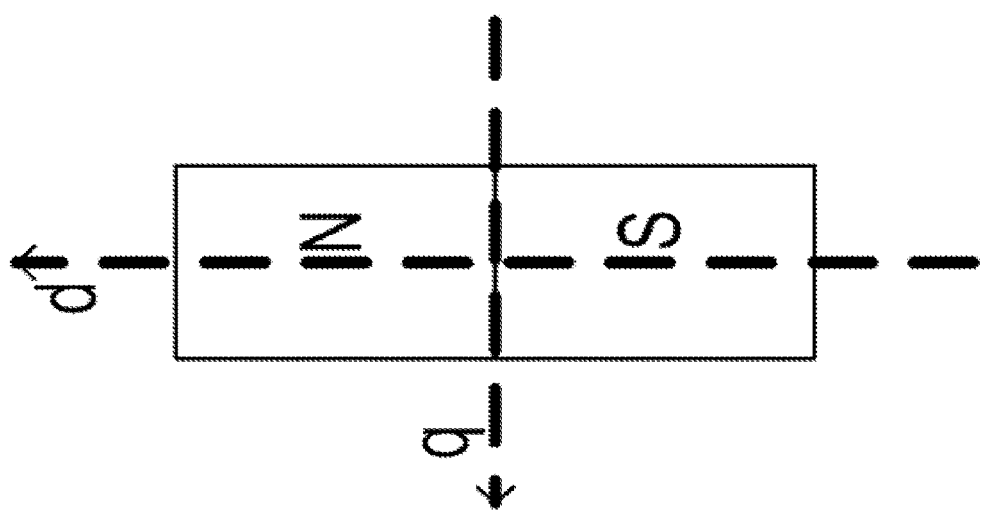
In FIG. 1, the q-direction and the d-direction of the rotor of a synchronous machine are schematically illustrated, the rotor being magnetized according to a permanent magnet.
Figure 2:
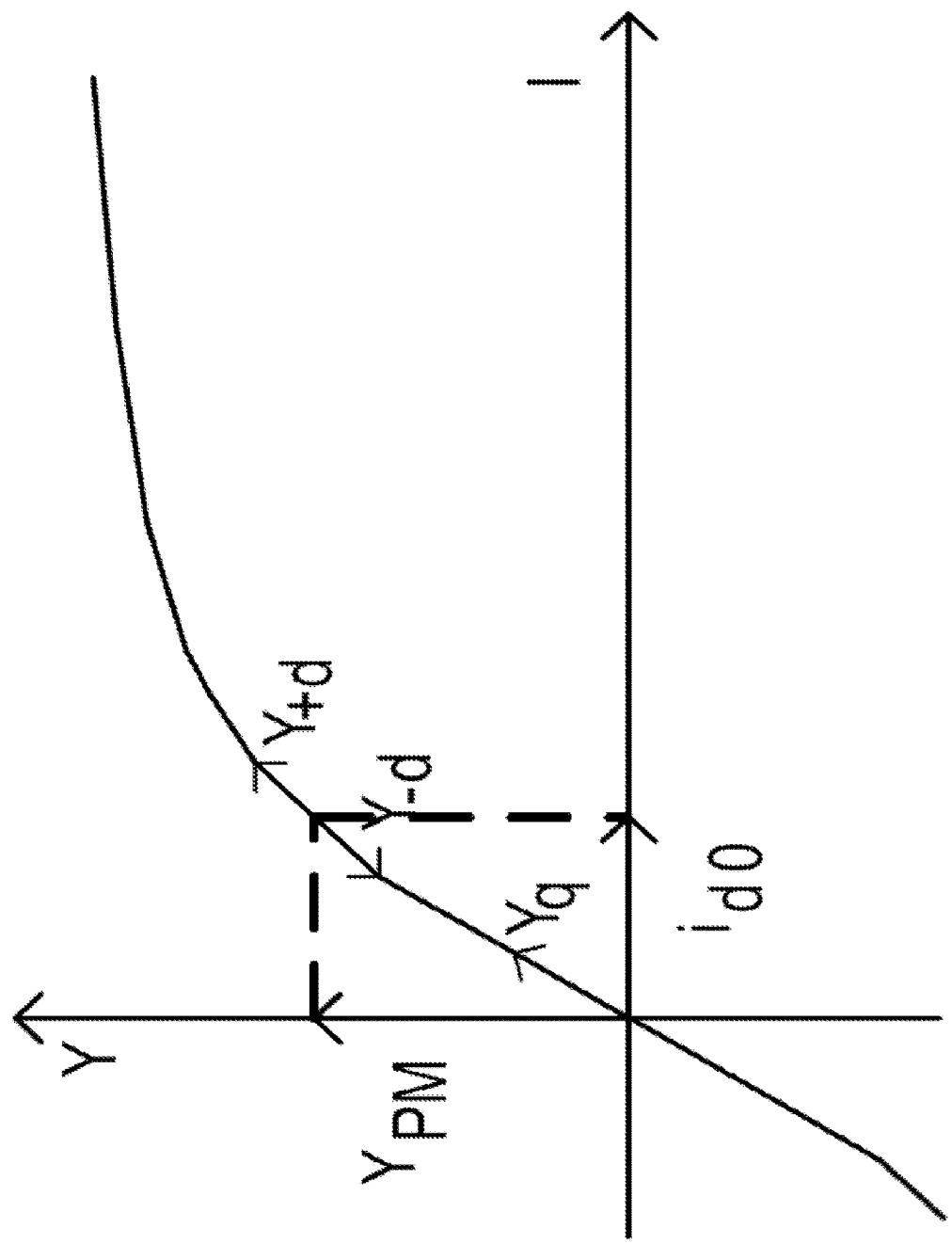
FIG. 2 schematically illustrates the magnetization characteristic curve, where Y is the magnetic flux, and I is the stator current.

As illustrated in FIG. 2, permanent flux Y_PM induced by the permanent magnet corresponds to an offset magnetization current I_d0 in the d-direction.

On that basis, a stator current causes a change in the stator flux, whose component in the d-direction is denoted by Y_d and whose component counter to the d-direction is denoted by Y_−d. Y_d and Y_−d differ on account of the offset. The component of the stator flux in the q-direction is denoted by Y_q.

Figure 3:
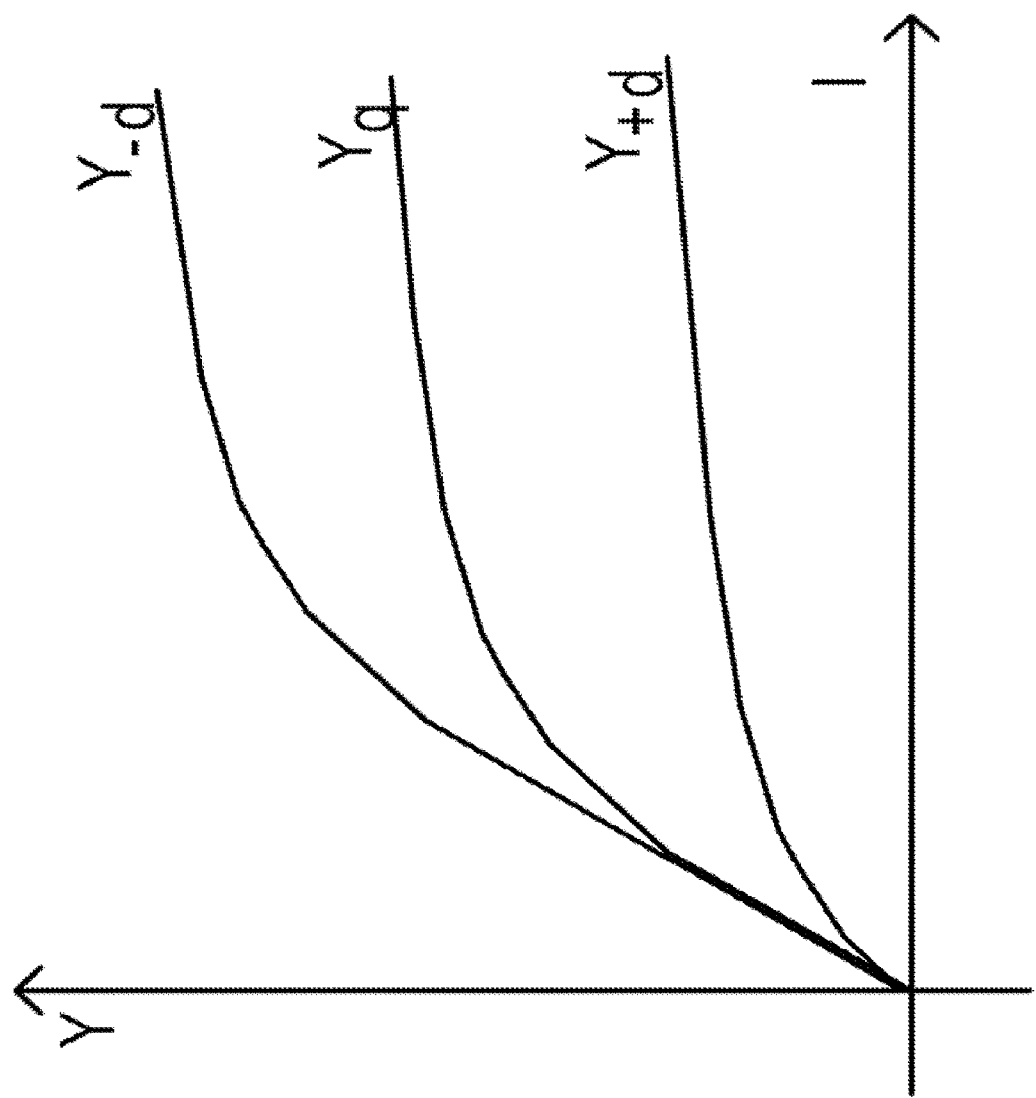
FIG. 3 illustrates the flux characteristic curves as a function of the stator current.
Figure 4:
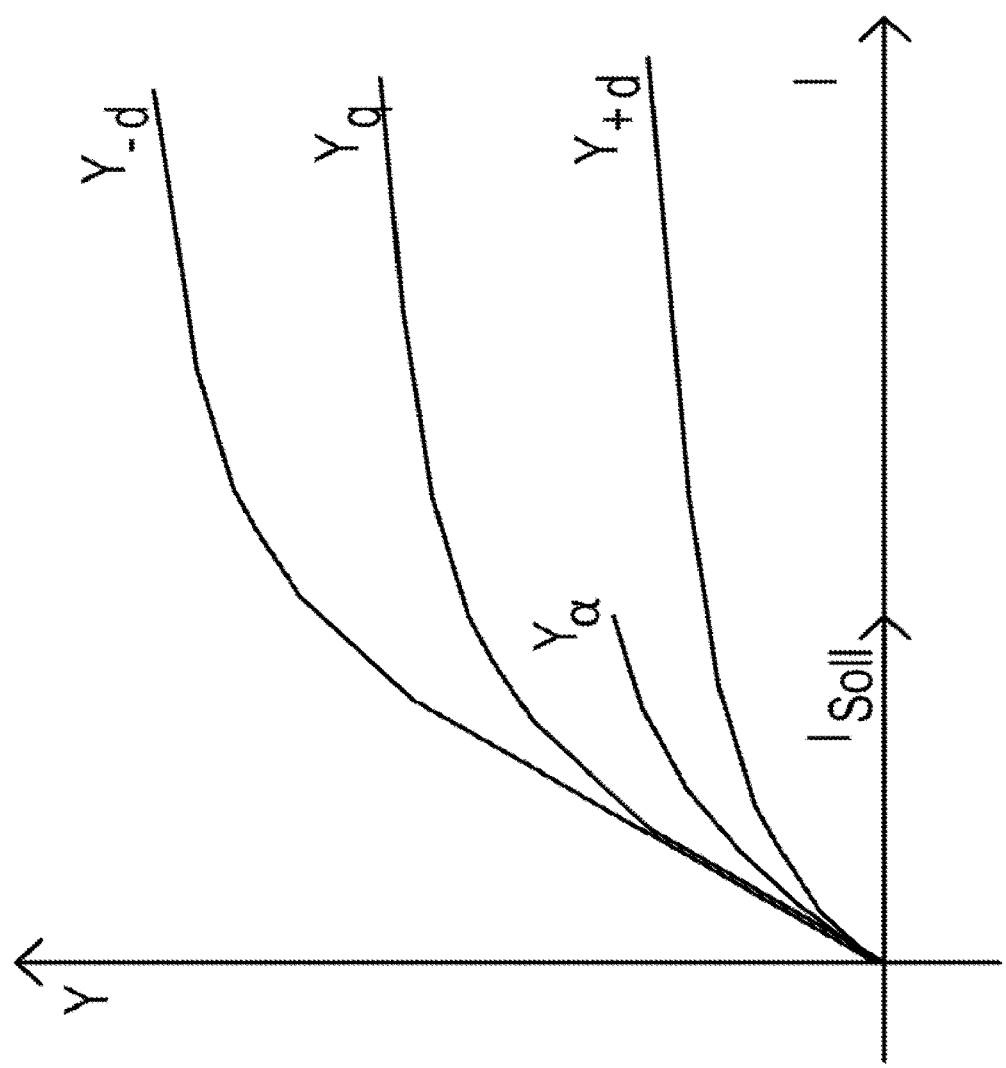
FIG. 4 illustrates the characteristic of the flux determined from measured values, i.e. the model value, in particular.

The dependence of the mentioned components Y_d, Y_−d and Y_q on the stator current is schematically illustrated in FIG. 3, and a respective characteristic curve has been allocated to each of the components. These characteristic curves are measured during the production or prior to the initial operation and stored in the memory of the signals electronics which includes a processing unit. Thus, the processing unit is able to determine the values of the components as a function of the respective stator-current value.

The synchronous motor has a rotor which is rotatably mounted in relation to a stator winding. The stator winding is arranged as a rotating field winding which has a three-phase supply. The synchronous motor may therefore be operated as a three-phase motor.

The motor is supplied by an inverter, which has three half-bridges supplied via a unipolar voltage, in particular a DC intermediate circuit. Each of the half-bridges has a series connection of two controllable power semiconductor switches, in particular IGBT or MOSFET switches. The respective center tap of the series connections represents one of the phase voltages for the supply of the stator winding.

A signal electronics supplies pulse-width modulated actuation signals for actuating the power switches. The stator winding may thus be supplied with a three-phase voltage of a predefinable amplitude and frequency.

The unipolar voltage is acquired with the aid of a voltage-acquisition device, which means that the processing unit is able to determine the respective current phase voltage from the pulse-width modulation ratio of the actuation signals of the power switches of the respective half-bridge. The stator-voltage space vector, especially its amount and direction, is therefore able to be determined from the determined phase voltage values as well.

In addition, the motor current is also determined, i.e. the currents flowing in the three phases. A corresponding current-acquisition device that includes a single part or multiple parts is provided for this purpose. The stator-current space vector, i.e. in particular its amount and direction, is determined from the respective current values currently acquired.

At the outset, a setpoint current, that is to say, a setpoint stator-current space vector, is specified to the controller situated in the processing unit. It generates actuation signals for the power semiconductor switches of the inverter such that the acquired actual variable, i.e. the stator-current space vector ascertained based on the acquired current values of the current-acquisition device, is controlled to the setpoint current through the appropriate setting of the motor voltage, i.e. the stator-voltage vector space. The actual variable has a predefined direction, i.e. an actuation angle.

During this control process, i.e. the controlling of the actual variable to the setpoint variable, the flux that builds up accordingly is determined.

By integrating the difference between stator voltage U_S and the product of stator resistance R_S and stator current I_S, stator flux Y_a is determined, i.e. in the following manner:

$$Y\_a = \int (U\_S - R\_S * I\_S) dt,$$

Stator resistance R_S is a parameter which is determined during the construction, production or the initial operation and is stored in a memory of the signaling unit, and is therefore known to the processing unit.

The angle of rotation a of the rotor of the synchronous machine relative to the actuation angle of the setpoint stator-current space vector is not known at the outset. In order to determine this angle of rotation a, the values of components Y_d, Y_-d and Y_q are first ascertained for the currently determined stator current according to method hereof, using the characteristic curves.

Then, an ellipse defined by the three values is used for the interpolation. Toward this end, a main axis having the length Y_d+Y_-d is formed from components Y_d and Y_-d, and component Y_q is plotted in a direction perpendicular thereto.

Figure 5:
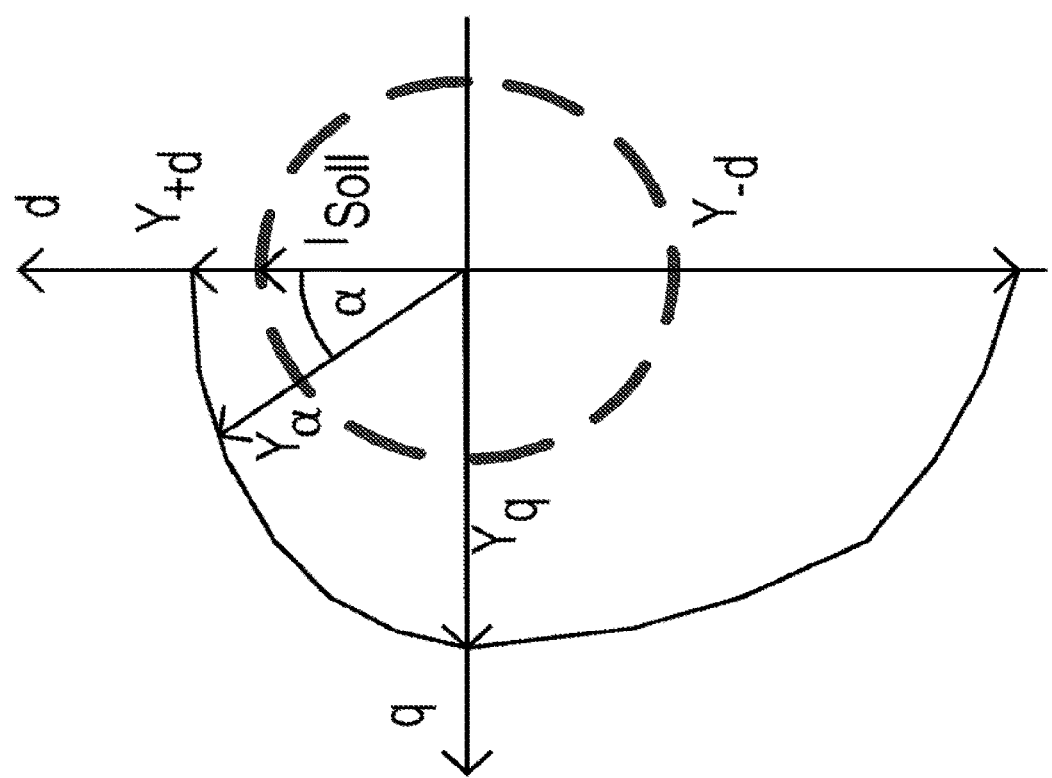
In FIG. 5, the characteristic of the stator flux amount is illustrated.

Next, the particular angle a at which the determined stator flux Y_a touches the ellipse is determined, as illustrated in FIG. 5.

The determination is carried out according to the relationship:

$$\sin^2(a) = (Y\_a^2 - Y\_d^2)/(Y\_q^2 - Y\_d^2), \text{ when } Y\_d < Y\_a <= Y\_q,$$

and from the relationship:

$$\sin^2(a-90°) = (Y\_a^2 - Y\_q^2)/(Y\_{-d}^2 - Y\_q^2), \text{ when } Y\_q < Y\_a <= Y\_{-d}.$$

Since the ellipse is in mirror symmetry with respect to the main axis, the mentioned method steps are repeated at some other point in time, e.g., at an actuation angle of stator current I_S substantially offset by 90°. This makes it possible to avoid ambiguities.

By setting a setpoint stator-current space vector and determining model variable Y_a induced thereby, a determination of the direction is therefore provided; in order to exclude ambiguities, this method is repeated twice or multiple times using different actuation angles of the setpoint stator-current space vector. An execution carried out multiple times makes it possible to reduce the measuring error.

The synchronous motor should be arranged as a fundamental-wave motor for the implementation of the method and apparatus hereof. This is so because in the case of such motors two inductivity values, e.g., the value of the inductivity in the q-direction and the value of the inductivity in the d-direction, are sufficient for a complete description of the dependence of the inductivity on the angle of the rotor. Deviations of a higher order are not taken into account.

The flux-value dependence associated with a stator current is representable as an ellipse, so that the flux in the d-direction is smaller than in the q-direction. In an intermediate direction, i.e. in a direction having angle a, which lies between the d-direction and the q-direction, the flux assumes a value according to the characteristic of the ellipse, which lies between the value in the q-direction and the value in the d-direction.

The ellipse is a suitable interpolation function, which lends itself to an approximate determination of the intermediate values of the flux. The main axis is defined by the sum of the amounts of the value of the flux in the d-direction and counter to the d-direction, and the minor axis of the ellipse is defined by double the value of the flux in the q-direction.

For the consideration of higher orders, and thus particularly for the consideration of a more precise characteristic of the inductivity, a higher order function has to be used.

Example embodiments of the present invention therefore provide a method for determining the angular position of the rotor of a synchronous motor, in which interpolation points are ascertained from stator-current-dependent characteristic curves of components of the stator flux, by which an interpolation function is established, e.g., an ellipse. Thus, the stator flux, which is formed as a model variable from the acquired motor current and motor-voltage values, is compared to the interpolation function and the angular position is determined on that basis. An unambiguous ascertainment of the angular position is achievable by a repeated execution of the aforementioned steps, in which case the setpoint stator current is predefined in different directions.

FIG. 6 schematically illustrates a method 200 for determining an angular position of a rotor of a synchronous motor including a stator winding fed by a three-phase voltage set by an inverter according to an example embodiment of the present invention. The method 200 includes: supplying a control signal to the inverter to set the three-phase voltage fed to the motor as a stator voltage to control a stator current, acquired by a current-acquisition device, to a setpoint stator current 202; determining a stator flux from a time characteristic of the stator voltage and an acquired value of the stator current 204; and determining the angular position of the rotor from the stator flux and a flux-value dependence, which represents the stator flux as a function of the angular position of the rotor, as a function of the stator current.

Figure 7:
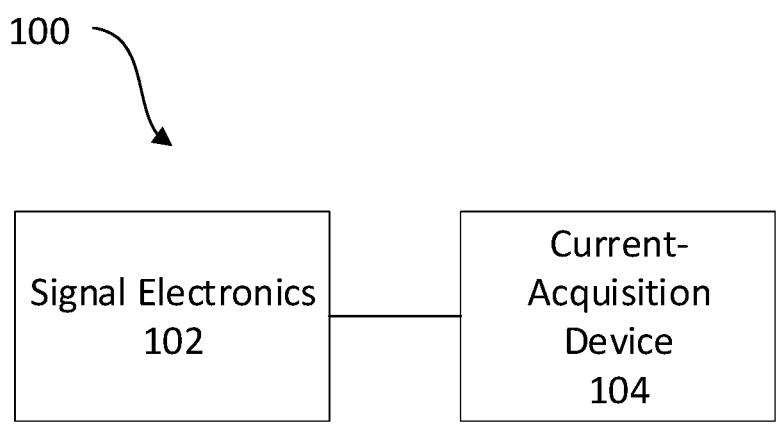
FIG. 7 schematically illustrates an apparatus according to an example embodiment of the present invention.

FIG. 7 schematically illustrates an apparatus 100 according to an example embodiment of the present invention. As illustrated in FIG. 6, apparatus 100 includes: signal electronics 102; and a current-acquisition device 104 adapted to acquire a motor current connected to the signal electronics 102. The apparatus 100 is adapted to perform the method described herein.

What is claimed is:

1. A method for determining an angular position of a rotor of a synchronous motor including a stator winding fed by a three-phase voltage set by an inverter, comprising:

supplying a control signal to the inverter to set the three-phase voltage fed to the motor as a stator voltage to control a stator current, acquired by a current-acquisition device, to a setpoint stator current;

determining a stator flux from a time characteristic of the stator voltage and an acquired value of the stator current; and determining the angular position of the rotor from the stator flux and a flux-value dependence as a function of the stator current;

wherein the flux-value dependence represents the stator flux as a function of the angular position of the rotor; and wherein the angular position of the rotor is determined based on predetermined characteristic curves of stator flux and stator current in a plurality of directional components of stator flux.

2. The method according to claim 1, further comprising feeding the three-phase voltage to the stator winding of the motor.

3. The method according to claim 1, wherein the components include a d-direction and a q-direction.

4. The method according to claim 1, wherein the stator flux is determined at multiple points in time and the angular position of the rotor is determined at corresponding points in time from the stator flux and the flux value dependence.

5. The method according to claim 1, wherein the flux-value dependence is stored in a memory of signal electronics adapted to control the inverter.

6. The method according to claim 1, wherein the characteristic curves are stored in memory of signal electronic adapted to control the inverter.

7. The method according to claim 1, wherein the flux-value dependence is determined based on an interpolation function.

8. The method according to claim 7, wherein the interpolation function includes a second-order function and/or an elliptical function.

9. The method according to claim 1, further comprising determining the flux-value dependence for each stator current.

10. The method according to claim 1, wherein the flux-value dependence is determined during manufacture of the motor, during an initial operation of the motor, and/or from interpolation points to provide a respective value of a flux component according to a characteristic curve as a function of the stator current.

11. The method according to claim 1, wherein the setpoint stator current has a predefined first actuation angle relative to a stator winding in a d-direction.

12. The method according to claim 1, wherein the function includes an interpolation function, which interpolates between interpolation points.

13. The method according to claim 12, further comprising ascertaining a respective interpolation point with the aid of a respective characteristic curve from the value of the stator current.

14. The method according to claim 13, wherein the respective characteristic curve represents a respective component of the flux as a function of the stator current, so that the respective interpolation point has the value of a respective component in the currently acquired stator current.

15. The method according to claim 13, wherein a first one of the characteristic curves includes components of the flux in a d-direction and/or in a first direction of a rotor-based coordinate system.

16. The method according to claim 15, wherein a second one of the characteristic curves includes components of the flux counter to the d-direction and/or counter to the first direction of the rotor-based coordinate system.

17. The method according to claim 15, wherein a third one of the characteristic curves includes components of the flux in a q-direction and/or in a direction perpendicular to the first direction of the rotor-based coordinate system.

18. The method according to claim 12, wherein the interpolation function includes a second-order function and/or an elliptical function.

19. An apparatus, comprising:

signal electronics; and a current-acquisition device adapted to acquire a motor current connected to the signal electronics;

wherein the apparatus is adapted to perform the method recited in claim 1.

* * * * *